US010664813B2

(12) United States Patent
Kursun et al.

(10) Patent No.: US 10,664,813 B2
(45) Date of Patent: May 26, 2020

(54) SYSTEMS AND METHODS FOR TRANSACTION PRE-FETCHING, PROCESSING AND PROVISIONING THROUGH SMART VEHICLE ELECTRONIC SYSTEM AND BACK-END CLOUD INFRASTRUCTURE

(71) Applicant: JPMorgan Chase Bank, N.A., New York, NY (US)

(72) Inventors: Eren Kursun, New York, NY (US); Sih Lee, Northvale, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 697 days.

(21) Appl. No.: 14/555,021

(22) Filed: Nov. 26, 2014

(65) Prior Publication Data

US 2016/0012403 A1    Jan. 14, 2016

Related U.S. Application Data

(60) Provisional application No. 62/024,272, filed on Jul. 14, 2014.

(51) Int. Cl.
*G06Q 40/00* (2012.01)
*G06Q 20/18* (2012.01)
(Continued)

(52) U.S. Cl.
CPC ......... *G06Q 20/18* (2013.01); *G06Q 20/1085* (2013.01); *G06Q 20/3224* (2013.01); *G06Q 20/40* (2013.01); *G06Q 20/4016* (2013.01)

(58) Field of Classification Search
CPC ............... G06Q 20/18; G06Q 20/1085; G06Q 20/3224; G06Q 20/40; G06Q 20/4016
See application file for complete search history.

(56) References Cited

U.S. PATENT DOCUMENTS 5,899,982 A * 5/1999 Randle .................. G06Q 20/00
705/35
6,104,962 A * 8/2000 Sastry ................ G05B 19/0426
700/2

(Continued)

OTHER PUBLICATIONS

Notification of Transmittal of the International Search Report and the Written Opinion of the International Searching Authority, or the Declaration (PCT/US2015/040129), dated Oct. 23, 2015.

(Continued)

*Primary Examiner* — Rajesh Khattar
(74) *Attorney, Agent, or Firm* — Greenberg Traurig LLP

(57) ABSTRACT

Systems and methods for transaction pre-fetching, processing and provisioning through smart vehicle electronic system and back-end cloud infrastructure are disclosed. In one embodiment, a method for partitioning a transaction to be performed using a plurality of resources may include (1) a decision engine computer processor receiving a transaction request; (2) the decision engine computer processor identifying a first portion of the transaction request to be performed using a first resource and a second portion of the request required to be performed using a second resource; (3) the decision engine computer processor retrieving capability information for the first resource and the second resource; and (4) the decision engine computer processor allocating a first portion of the transaction request to the first resource, and a second portion of the transaction request to the second resource, based on the first required portion, the second required portion, and the capability information.

14 Claims, 6 Drawing Sheets

(51) Int. Cl.
*G06Q 20/40* (2012.01)
*G06Q 20/10* (2012.01)
*G06Q 20/32* (2012.01)

(56) References Cited

U.S. PATENT DOCUMENTS

| | | | |
|---|---|---|---|
| 6,199,754 B1* | 3/2001 | Epstein | G06Q 20/1085 |
| | | | 235/379 |
| 6,484,155 B1* | 11/2002 | Kiss | G06F 17/30864 |
| | | | 706/45 |
| 7,712,657 B1* | 5/2010 | Block | G06Q 20/1085 |
| | | | 235/379 |
| 8,407,144 B2* | 3/2013 | Roberts | G06F 21/316 |
| | | | 705/17 |
| 8,452,702 B1* | 5/2013 | O'Donnell | G06Q 40/02 |
| | | | 235/379 |
| 9,760,702 B1* | 9/2017 | Kursun | G06F 21/32 |
| 2002/0099657 A1* | 7/2002 | Black | G06Q 20/1085 |
| | | | 705/43 |
| 2003/0187787 A1 | 10/2003 | Freund | |
| 2004/0166905 A1* | 8/2004 | Cherniski | G06F 1/183 |
| | | | 455/575.1 |
| 2007/0067310 A1* | 3/2007 | Gupta | G06F 9/5044 |
| 2008/0288295 A1* | 11/2008 | Caballero | G06Q 10/10 |
| | | | 705/4 |
| 2009/0024525 A1 | 1/2009 | Blumer et al. | |
| 2009/0289113 A1 | 11/2009 | Vilnai et al. | |
| 2011/0231310 A1* | 9/2011 | Roberts | G06F 21/316 |
| | | | 705/40 |
| 2013/0151412 A1* | 6/2013 | Spahl | G06Q 20/40 |
| | | | 705/44 |
| 2014/0058805 A1 | 2/2014 | Paesler et al. | |
| 2014/0188722 A1* | 7/2014 | Xie | G07C 11/00 |
| | | | 705/42 |
| 2015/0058215 A1* | 2/2015 | Johnson | G06Q 20/1085 |
| | | | 705/43 |
| 2015/0220916 A1* | 8/2015 | Prakash | G06Q 20/36 |
| | | | 705/41 |
| 2018/0276674 A1* | 9/2018 | Ramatchandirane | G06F 21/335 |

OTHER PUBLICATIONS

International Search Report (PCT/US2015/040129), dated Oct. 23, 2015.
Written Opinion of the International Searching Authority (PCT/US2015/040129), dated Oct. 23, 2015.

* cited by examiner

SYSTEMS AND METHODS FOR TRANSACTION PRE-FETCHING, PROCESSING AND PROVISIONING THROUGH SMART VEHICLE ELECTRONIC SYSTEM AND BACK-END CLOUD INFRASTRUCTURE

RELATED APPLICATIONS

This application is a nonprovisional application of U.S. Provisional Patent Application Ser. No. 62/024,272, entitled "Systems And Methods For Transaction Pre-Fetching, Processing And Provisioning Through Intelligent Vehicle Electronic System And Back-End Cloud Infrastructure" filed Jul. 14, 2014. It is also related to the following U.S. Provisional Patent Applications: U.S. Provisional Patent Application Ser. No. 62/024,310, entitled "Systems And Methods For Self-Driving Or Self-Propelled Branch Automated Teller Machines For Secure Banking Applications"; U.S. Provisional Patent Application Ser. No. 62/024,398, entitled "Systems And Methods For Smart Vehicle Resident Mobile Banking Applications And Customized Biometrics Through Embedded Sensing"; and U.S. Provisional Patent Application Ser. No. 62/024,407, entitled "Systems And Methods For Predictive Resource Allocation And Location Optimization For Self Driving Bank Branch/ATMs." The disclosure of each of these provisional applications is hereby incorporated by reference in its entirety.

BACKGROUND OF THE INVENTION

1. Field of the Invention

The present invention generally relates to systems and methods for transaction pre-fetching, processing and provisioning through smart vehicle electronic system and back-end cloud infrastructure.

2. Description of the Related Art

Drive-through Automatic Teller Machines (ATMs) are commonly found in the United States and in other geographies. For routine banking transactions, a customer often drives to a bank, waits in the drive-through ATM queue, and, when it is his turn, conducts the transaction and is on his way.

SUMMARY OF THE INVENTION

Systems and methods for transaction pre-fetching, processing and provisioning through smart vehicle electronic system and back-end cloud infrastructure are disclosed.

In one embodiment, a system for transaction pre-fetching and provisioning may include a vehicle that may include at least one input device for receiving a transaction request, the transaction request comprising a first portion to be completed using at least one vehicle resource, and a second portion to be completed using a remote resource; at least one vehicle computer processor in communication with the input device that receives the transaction request; and a communication interface. The system may also include a plurality of remote resources for performing the second portion of the transaction request, and a decision engine comprising at least one computer processor in communication with the vehicle communication interface and the plurality of remote resources that identifies the first portion of the transaction request and the second portion of the transaction request, and directs the at least one vehicle resource to perform the first portion of the transaction request and selects one of the plurality of remote resources to perform the second portion of the transaction request.

In one embodiment, the vehicle resource may include a plurality of vehicle sensors, and each vehicle sensor detects a characteristic of the user. The vehicle computer processor may authenticate a user based on the characteristics detected by the vehicle sensors.

In one embodiment, the at least one vehicle computer processor may authenticate a user based on the detected characteristics by comparing the detected characteristics to a user profile.

In one embodiment, the vehicle sensor may be a camera, a microphone, a weight sensor, a fingerprint sensor, a pressure sensor, a motion sensor, and/or an input device.

In one embodiment, remote resources may be an automated teller machine, a banking kiosk, a drive-through banking resource, or a branch facility.

In one embodiment, the decision engine may also receive remote resource availability data regarding the availability of each of the plurality of remote resources and selects the one remote resource to perform the second portion of the transaction request based on the remote resource availability data.

In one embodiment, the decision engine may also receive vehicle location data and selects the one remote resource to perform the second portion of the transaction request based on the vehicle location data.

In one embodiment, the system may further include a mobile electronic device in communication with at least one of the vehicle computer processor and the decision engine, wherein the mobile electronic device comprises at least one mobile electronic device sensor for detecting a characteristic of the user, and wherein the at least one vehicle computer processor authenticates a user based on the characteristics detected by the vehicle sensors and the mobile electronic device sensor.

A method for partitioning a transaction to be performed using a plurality of resources is disclosed. According to one embodiment, the method may include (1) at least one decision engine computer processor receiving a transaction request; (2) the at least one decision engine computer processor identifying a first portion of the transaction request to be performed using a first resource and a second portion of the request required to be performed using a second resource; (3) the at least one decision engine computer processor retrieving capability information for the first resource and the second resource; and (4) the at least one decision engine computer processor allocating a first portion of the transaction request to the first resource, and a second portion of the transaction request to the second resource, based on the first required portion, the second required portion, and the capability information.

In one embodiment, the first resource may be a vehicle having a user interface for conducting the first portion of the transaction, and the vehicle may include a plurality of vehicle sensors, and each vehicle sensor detects a characteristic of the user, and the at least one decision engine receives the detected characteristics from the vehicle.

In one embodiment, the method may further include the at least one decision engine computer processor authenticating the user based on the detected characteristics.

In one embodiment, the second resource may be an automated teller machine, a banking kiosk, a drive-through banking resource, or a branch facility In one embodiment, the at least one decision engine computer processor may also receive vehicle location data and selects the second resource to perform the second portion of the transaction request based on the vehicle location data.

In one embodiment, the at least one decision engine computer processor may also receive weather data and/or traffic data and selects the second resource to perform the second portion of the transaction request based on the weather data and/or traffic data.

In one embodiment, the at least one decision engine computer processor may also receive event data and selects the second resource to perform the second portion of the transaction request based on the event data.

BRIEF DESCRIPTION OF THE DRAWINGS

For a more complete understanding of the present invention, the objects and advantages thereof, reference is now made to the following descriptions taken in connection with the accompanying drawings in which:

FIG. 5 is a depiction of a table that may provide device information for a user according to one embodiment; and FIG. 6 is a depiction of a table that may specify preferences for the way that certain transactions may be handled according to one embodiment.

DETAILED DESCRIPTION OF PREFERRED EMBODIMENTS

Figure 1:
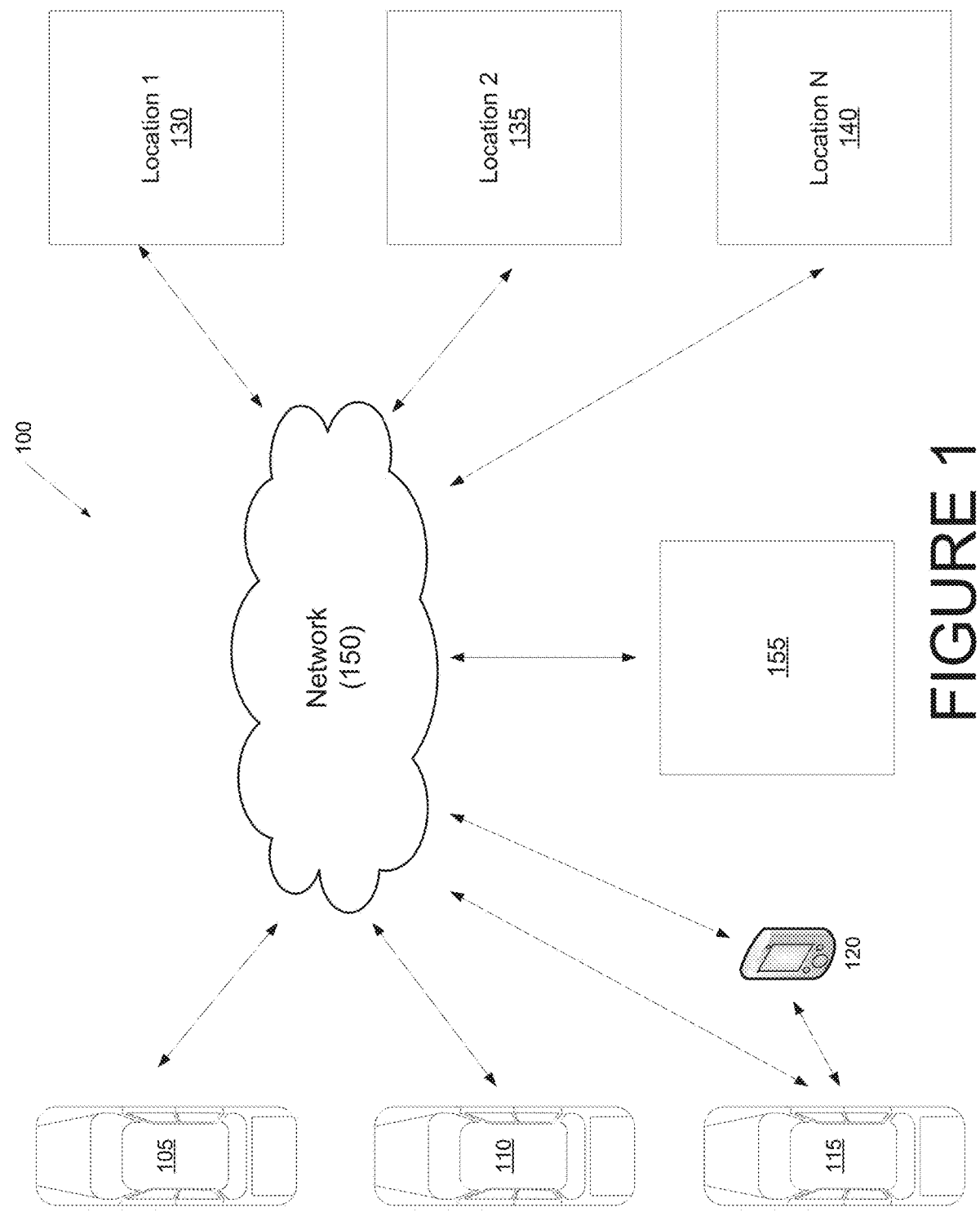
FIG. 1 is a block diagram of a system for transaction pre-fetching, processing and provisioning according to one embodiment.

Several embodiments of the present invention and their advantages may be understood by referring to FIGS. 1-6.

Drive-through Automatic Teller Machines (ATMs) (and other drive-through services) are commonly found in the United States and in other geographies. Emerging vehicle technologies, such as weight sensors, voice recognition, cameras, etc. may be leveraged to improve transaction processing through preprocessing, authentication, pre-fetching of data, and other processes at the trusted end device of the user. In addition, mobile devices may also be used to leverage this technology.

As used herein, the term "ATM" may include Automated Teller Machines as well as drive-through services, walk-up services, branch services, teller services, and other resources. For example, a user's in-person transaction with a branch representative may be preprocessed, authenticated, data pre-fetched, etc. based on data collected via the user's vehicle and/or mobile device.

Moreover, it should be recognized that although the disclosure may be in the context of the banking industry, the present disclosure has wide applicability. For instance, it may be used where a transaction may be partitioned between local/restricted capabilities of a local device and limited resources of a shared pool. Examples include the insurance industry, medical industry, pharmacies, etc.

In one embodiment, the disclosure may be used in a medical environment. For example, with a medical application where the vehicle sensors and/or mobile device may sense certain health signals from the user (e.g., heart rate, temperature, pulse, etc.). This information may be provided to the onboard vehicle system to a computational back-end that may have artificial intelligence components for medical use and may be accessible by a medical professional. The response as well as the data acquisition may be partitioned between the local intelligent vehicle resources and capabilities, and the remote (e.g., in-person) mode.

In another embodiment, the disclosure has applicability where data in support of a transaction may be pre-fetched. In still another embodiment, the disclosure has applicability where a user may be remotely authenticated with a similar level of confidence as if the user were authenticated in person.

As used herein, the phrase "smart vehicle" may refer to a vehicle having built-in sensors, with added sensors, additional devices (e.g., mobile devices), etc. that may be able to sense or detect one or more characteristics of a person. Examples of such vehicles include cars, motorcycles, boats, airplanes, trains, etc. A smart vehicle or the systems/devices that typically accompany such a vehicle may be used to coordinate a user's interaction with a drive-through interface, such as a drive-through ATM, an in-person transaction, etc. In another embodiment, a combination of a smart vehicle and mobile device(s) may be used.

In one embodiment, the authentication process may be accelerated or facilitated by enabling out-of-band authentication through a range of devices including the user mobile device, vehicle technologies in a smart vehicle, etc. Such authentication may include, for example, coordinating the authentication (e.g., biometric authentication, password-based authentication, behavioral authentication, etc.) through one or more devices. For example, the biometric authentication may be performed by the smart vehicle itself, while multi-factor authentication can be completed by authenticating the user with the mobile device through passwords or other methods.

The smart vehicle may communicate the authentication information with, for example, the automatic teller machine in the vicinity (or any other desired device, network, etc.), a branch location, etc. The ATM or branch representative may then acquire a reduced amount of verification data to expedite the process.

The data acquisition process may be controlled by the smart vehicle system and/or the user's mobile device. In another embodiment, it may be controlled, remotely, by the financial institution, automatic teller machine controls, branch system controls, etc. in coordination with the back-end servers, the local branch/ATM controls, etc.

Some or all of the acquired data may be stored on the mobile device and/or the smart vehicle system to be communicated at the time of the transaction. The type and amount of data that is stored on the mobile device or smart vehicle system may be determined by applicable regulations and encrypted for security. In another embodiment, some or all of the acquired information can be dynamically communicated at each stage of the process.

The remote access process may also provide teleconferencing (for example, in the case of financial services, for investment/financial services, etc.) and other options to the user prior to arrival at the ATM or other destination.

Based on, for example, the acquired data and the user's profile information, the financial institution side may plan/partition the request.

In one embodiment, a transaction partitioning table, any associated algorithms, processes, procedures, etc. may be stored and/or used for each individual type of transaction. Depending on the type of transaction, security requirements, device characteristics (e.g., for mobile device, for sensing/input devices in a "smart vehicle", etc.), local branch characteristics, etc. this table may be used to guide the partitioning algorithms to that may work with the transaction partitioning table. In one embodiment, the partitioning guidelines may involve static components as well as configurable dynamic components that may provide parameters about the larger system and queues at any point in time.

This process may involve partitioning the required steps between the remote access and in-person transaction to optimize the speed and efficiency of the process. For example, if the queue at the local branch/automatic teller machine is long, then some or most of the transaction may be performed locally on the smart vehicle control system and/or mobile device with additional security controls. The remaining portion of the transaction may be left to be completed in-person, for example, at the associated back-end and/or drive-through branch/ATM resources.

In addition to partitioning the transaction intelligently between smart vehicle and remote resources, the system may stage the transaction at an appropriate location to complete the part of the transaction that needs to be completed in-person. The system may give the user the option of selecting a location to complete the transaction, provide the route, provide information on what can be completed before arriving, etc. The security and transaction processing specifications may be dynamically adjusted based on the characteristics/availability of the resources at any point in time, as well as the user's location, which may be considered by the smart vehicle systems.

In one embodiment, the system may learn the user's preferences for conducting transactions (e.g., the user always selects a certain branch location rather than the closest branch location) and may provide corresponding solutions for those preferences.

In another embodiment, the user may manually enter his or her preferences.

In one embodiment, a collection of user preferences may comprise a user profile.

The acquired data and user profile (e.g., sensitivity to delay) may be considered for the given transaction. The branch/financial institution back-end may perform resource provisioning based on the information (e.g., each upcoming user, remotely acquired data, transaction prefetching data, user's profile delay sensitivity, estimated arrival time, etc.). Resource provisioning may include access to dedicated authentication and transaction machines, access to financial advisors or others, printing/depositing/deposit box and other physical access requirements.

The plan for the upcoming transactions may be maintained on the branch/ATM/local financial institution side and dynamically updated, modified, or refined for each user based on the passage of time, changes in the queue (new users coming in, resource constraints, etc.), etc.

The optimization function for the transaction plan may be a combination of one or more of user satisfaction metrics (incorporating users sensitivity to delays/wait time/access to resources etc.), branch performance metrics (volume and criticality of transactions), security and compliance goals, authentication accuracy and trustworthiness of the smart vehicle system, etc.

According to one embodiment, systems and methods for intelligent partitioning of transactions are disclosed. The partitioning may be based on a customized dynamic metric function that may combine one or more of transaction information (e.g., transaction type, required security level, interactivity (e.g., whether the transaction can be executed while driving for instance), duration of the transaction, etc.), a user's profile (e.g., sensitivity to wait times, etc.), the current and predicted resource availability (Branch/ATM location, queue, delay information, etc.), smart vehicle capabilities (e.g., equipment capabilities such as weight sensors, voice recognition, behavioral sensors, cameras (e.g., for facial, iris, etc. biometric collection), trusted vehicle authentication and other security features, etc.), a GPS location of the smart vehicle, real-time and predicted traffic information, etc. In one embodiment, complementary capabilities of various mobile devices that may be registered to the user may be used with those of the smart vehicle features. For example, a portion of the authentication on user's mobile device can be communicated to smart vehicle where additional biometric authentication may be performed, and overall authentication info may be passed on to the back-end.

In one embodiment, pre-, partial or full authentication of the user may be conducted using smart vehicle capabilities (e.g., biometric collection devices, smartphone authentication, smart cars fingerprint sensors/tokens/keys etc., palm vein scan, camera, weight sensor, voice recognition, behavior sensors, etc.)

In one embodiment, techniques to combine smart vehicle authentication with vehicle security/level of trust for transaction parts are disclosed.

In one embodiment, techniques to calculate risk metrics for the transaction pieces considering the user, transaction, and/or smart vehicle characteristics etc. are disclosed.

In one embodiment, required security levels of the authentication may be matched with transaction components. For example, a transaction may be partitioned using out-of-band smart vehicle and smart phone resource for a desired security level.

In one embodiment, real-time GPS location and real time traffic information may be retrieved from, for example, a smart vehicle's sensors, a mobile device, a traffic service, etc. to optimize partitioning of transactions. For example, a decision engine may determine the best branch/ATM location for the specific vehicle based on, for example current/expected traffic, vehicle fuel levels, etc.

In one embodiment, the back-end system may coordinate the operation and roles of multiple devices in creating a seamless user transaction experience. For example, the user may initiate a transaction on mobile device, continue it in a smart vehicle, and later continue to use a wearable device, such as smart glasses, a smart watch, etc. In doing so, the system may use the availability, usability (under the circumstances), security, and functionality of these multiple devices to conduct the transaction.

In one embodiment, a system that performs these and other functions is disclosed. The system may include one or more of a smart vehicle equipment, back-end servers, communication channels, mobile devices, etc. to queue and process smart vehicle based banking requests, provision resources, and perform transaction partitioning.

FIG. 1 illustrates a system for transaction pre-fetching, processing and provisioning through smart vehicle electronic system and back-end cloud infrastructure according to one embodiment. System 100 may include smart vehicles 105, 110, 115; mobile device 120; locations 130, 135, 140; back-end 155, and network 150. Although only three users and three locations are illustrated, it should be recognized that many other users and/or locations may participate as necessary and/or desired.

In one embodiment, smart vehicles 105, 110, 115 may interact with a user via biometric sensing devices, cameras, motion/movement sensing devices, microphones, etc. In one embodiment, users may also interact with mobile device 120. Mobile device 120 may communicate directly with a smart vehicle (as illustrated, mobile device 120 communicates directly with smart vehicle 115) or indirectly via network 150. In one embodiment, mobile device may communicate with back-end 155 via network 150. Mobile device 120 may include, for example, smart phones, watches, eyewear, etc. that may include biometric sensors, cameras, motion/movement sensors, microphones, input devices, etc.

In one embodiment, smart vehicles 105, 110, and 115 may also sense and relay information regarding other smart vehicles. For example, a smart vehicle in the area of a user that is conducting a transaction may verify a location of the user.

Other vehicles and/or devices for verifying a user, a smart vehicle, etc. may be used as is necessary and/or desired. For example, a user may have his or her identity and/or location verified by a third party, such as a post office, another bank, notary, government agency (e.g., DMV), etc. In another embodiment, networked cameras, such as city cameras, transportation network cameras, etc. may be consulted to verify an identity and/or location of a user. In still another embodiment, drones may be used to verify a user's identity and/or location.

In one embodiment, locations 130, 135, and 140 may be any suitable facility with which the user may interact. In one embodiment, the facility may be a drive-through automated teller machine facility. In another embodiment, the facility may be a pharmacy. In still another embodiment, the facility may include educational systems. Other types of facilities may be included as is necessary and/or desired.

Back-end 155 may comprise at least one computer processor/server that communicates with smart vehicles 105, 110, and 115, mobile device 120, and locations 130, 135, and 140 via network 150, or any other suitable network. In another embodiment, back-end 155 may communicate directly with any or all of locations 130, 135 and 140 via a separate network.

In one embodiment, a network of smart devices and/or mobile devices, such as one or more of smart vehicles 105, 110, 115, and mobile device 120, may comprise a back-end.

In one embodiment, back-end 155 be a local server that operates on an ad hoc basis. Such a local server may cover a region, which may be a street, neighborhood, city, state, etc. In another embodiment, back-end 155 may be a server that serves a larger area (e.g., a state, region, or nation) operates to prioritize transaction requests on a national level. In one embodiment, local servers and "national" servers may operate together to process transaction requests.

In one embodiment, a local server may enforce local regulations. In another embodiment, a "national" server may enforce federal regulations. Any arrangement for enforcing local or federal regulations may be used as is necessary and/or desired.

In another embodiment, a local server may prioritize a transaction while a national server may operate on an ad-hoc basis.

In one embodiment, back-end 155 may provision and/or partition a service request that is received from smart vehicles 105, 110, 115 and/or mobile device 120. In one embodiment, back-end 155 may consider the contents of the request itself (e.g., urgency, required security, complexity, need for in-person service, etc.), user preferences, the availability of resources at any of locations 130, 135 and 140, environmental conditions (e.g., distance from a user to a location, traffic, etc.).

In one embodiment, the algorithms, processes, procedures, etc. described herein may reside on back-end 155 or in the cloud. In another embodiment, the algorithms, processes, procedures, etc. described herein may reside in a smart vehicle. In still another embodiment, the algorithms, processes, procedures, etc. described herein may reside at the facility.

Figure 2:
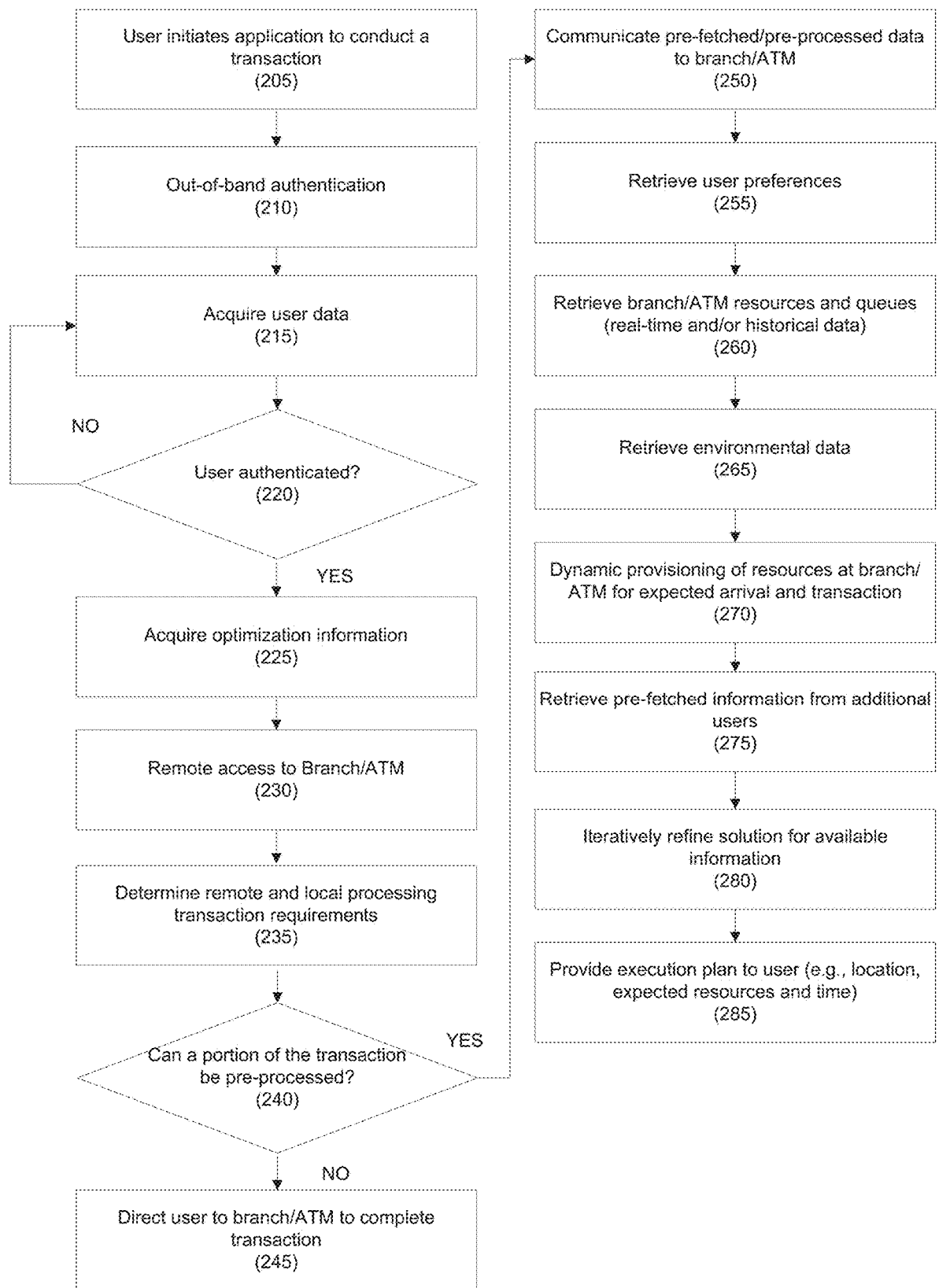
FIG. 2 is a flowchart depicting a method for transaction pre-fetching, processing and provisioning according to one embodiment.

Referring to FIG. 2, a flowchart depicting a method for transaction pre-fetching, processing and provisioning through smart vehicle electronic system and back-end infrastructure according to one embodiment is provided. In step 205, a user may initiate an application to interface with an entity, such as a financial institution. In one embodiment, the application may be executed by a computer processor in the user's vehicle; in another embodiment, the application may execute on an electronic device, tablet computer, etc. In still another embodiment, the application may be executed by both a vehicle and a separate electronic device.

In step 210, the user may be authenticated. In one embodiment, out-of-band authentication may be performed. In one embodiment, out-of-band authentication may be used. The authentication may be performed by vehicle systems and/or other electronic device.

In step 215, user data may be collected. In one embodiment, vehicle system, such as cameras, microphones, weight sensors, fingerprint sensors, pressure sensors, motion sensors, input devices, etc. may collect user data. Additional electronic devices, such as smartphones, fitness/health monitors, etc. may also collect user data. Further, user driving behavior data, such as a user route, speeds, braking habits, steering habits, etc. may be collected by the vehicle systems.

In one embodiment, the user data may be collected during a dedicated data collection process, or it may be collected during the user's ongoing interaction with the vehicle. For example, all necessary user data may be collected before the user initiates the application based on user interaction with the vehicle. Thus, no (or very little) dedicated data collection may be necessary.

In one embodiment, the collection of user data may be controlled by the entity (e.g., a financial institution, branch, ATM device, etc.) through remote communication with the entity. In another embodiment, the user data may be collected and stored in the vehicle, electronic device, etc., and provided to the entity at a suitable time (e.g., shortly before arrival at the entity's location, upon arrival at the entity's location, etc.).

In step 220, the user is authenticated. In one embodiment, the user may be authenticated by the entity. In another embodiment, the user may be authenticated by the vehicle system and/or the electronic device.

In one embodiment, the user may be initially authenticated by the vehicle system and/or the mobile device, and then may be again authenticated by the entity. The authentication may be on different levels. In one embodiment, because the entity may have greater computing power than the vehicle, the entity may be able to perform more detailed authentication than the vehicle.

If the user is not authenticated, data may be re-acquired, the process may stop, etc. In one embodiment, alternative sources of the data may be used, if available, to acquire the data.

In step 225, transaction optimization information may be collected. In one embodiment, the user's location may be acquired from the vehicle, electronic device, manual entry, etc. Additional data, such as the user's distance from one or more locations, traffic, queues at locations, etc. may also be acquired. User profile information, which may specify the user's sensitivity to wait times, travel, etc. may further be acquired.

In step 230, the entity's back-end may establish remote access to the facility, such as an ATM, a branch location, etc. In another embodiment, the user's smart vehicle or mobile device may establish contact with the facility, directly or via a network. In still another embodiment, the facility may establish communication with the user's smart vehicle or mobile device.

In step 235, remote and local processing transaction requirements are determined. For example, the transaction may be examined to determine the parts that may be performed remotely (e.g., by the vehicle system or electronic device), and what parts of the transaction must be performed in person (e.g., at a branch, at an ATM, etc.). For example, if the user wants to withdraw $20 from his or her checking account, the system may determine that all parts of the transaction may be conducted remotely except for the dispensing of the money. As another example, the user may wish to access his or her safety deposit box, which would need to be done in person. Still another may be the completion of a loan application, in which some information may be collected before the user arrives at the branch location.

In one embodiment, if in step 240, a portion of the transaction cannot be pre-processed (e.g., performed locally), in step 245, the user may be provided with directions to a location, and pre-fetched data may be communicated to the ATM/branch location. In one embodiment, the location may be determined based on closeness to the user's current position, situation relative to the user's route or destination, wait times, etc. In one embodiment, the user may be given an option among several locations to visit.

In one embodiment, the location may be communicated to the vehicle's system and directions may be generated via a navigation device.

In one embodiment, if the user cannot travel to a location, the transaction may be stored for a future time. In another embodiment, if the user cannot travel to the location, alternative transaction processes may be considered to optimize the user experience within the specified security guidelines. For example, a user may be directed to a trusted third party for verification. In another embodiment, a Mobile ATM or ATM Taxi, such as those described in U.S. Provisional Patent Application Ser. No. 62/024,610 and U.S. patent application Ser. No. 14/554,930 may be dispatched to the user's location. In still another embodiment, a drone may be dispatched to the user's location to authenticate, verify, and/or complete the transaction. In still another embodiment, another registered user may provide resources if available. For example, if one user desires to conduct a transaction to withdraw cash from an ATM but cannot travel to an ATM, the system may detect another registered user in the area (e.g., by tracking the GPS location of the registered users' devices), and may inquire as to whether the registered user has the requested funds on hand. If the registered user has sufficient funds and agrees to distribute the funds to the requesting user on behalf of the financial institution to the requesting user, the registered user may serve as a sort of "mobile ATM" for the requesting user.

In one embodiment, such transactions may be carefully monitored by the entity. For example, the entity may require that both users record the transaction using their mobile devices. Other security measures may be provided as is necessary and/or desired.

In step 250, the pre-fetched data may be communicated to the entity. For example, the data may be communicated to the back-end system, to a branch, to an ATM, etc.

In step 255, user preferences may be retrieved. In one embodiment, the user preferences may update those retrieved earlier in the process.

In step 260, data on the facility may be retrieved and/or updated. For example, ATM queue length, branch personnel workloads, etc. may be retrieved. In one embodiment, historical data for the facility may be retrieved in order to predict queues and/or workload.

In step 265, environmental data may be retrieved and/or updated. In one embodiment, traffic, weather, etc. may be retrieved in order to refine facility selection.

In step 270, the system may provision resources for the user to conduct the transaction. For example, as the expected arrival time for the user approaches, resources may be freed up so that they are available for the user. For resources that cannot be made available, a predicted wait time may be calculated.

In one embodiment, the provisioning may be dynamic to account for uncertainties in the user's arrival, scope of transaction, etc.

In step 275, pre-fetched data from other users may be received and processed and, in step 280, the solution may be refined based on this data. In one embodiment, the solution may change based on transactions having a higher priority than the user's, changes in queues, etc.

In step 285, the execution plan may be provided to the user for acceptance. In one embodiment, information such as the location, estimated arrival time, identity of the person with whom the user will meet, the ATM lane to use, expected length for the transaction, etc. may be provided. Other information may be provided as necessary and/or desired.

Figure 3:
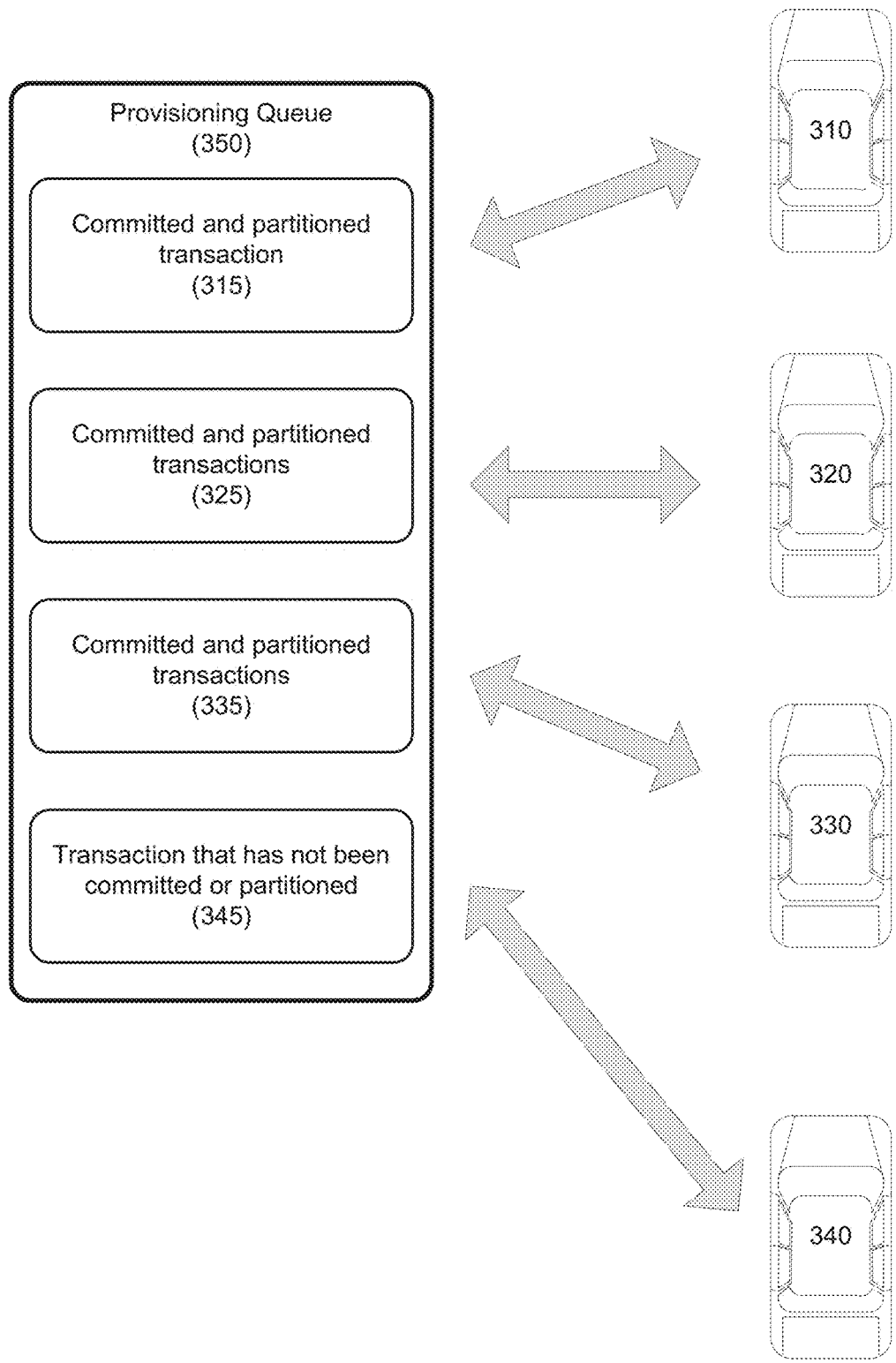
FIG. 3 is depiction of a provisioning queue according to one embodiment.

Referring to FIG. 3, an illustration of a provisioning queue according to one embodiment is provided. In this embodiment, a plurality of users 310, 320, 330 and 340 have submitted transaction requests 315, 325, 335, 345 to provisioning queue 350. The order of requests in provisioning queue may be the result of the partitioning and/or provisioning of each transaction requests 315, 325, 335, 345. In one embodiment, the partitioning and/or provisioning of transaction requests 315, 325, 335, 345 may change as additional transaction requests are received, resource availability changes, etc.

Figure 4:
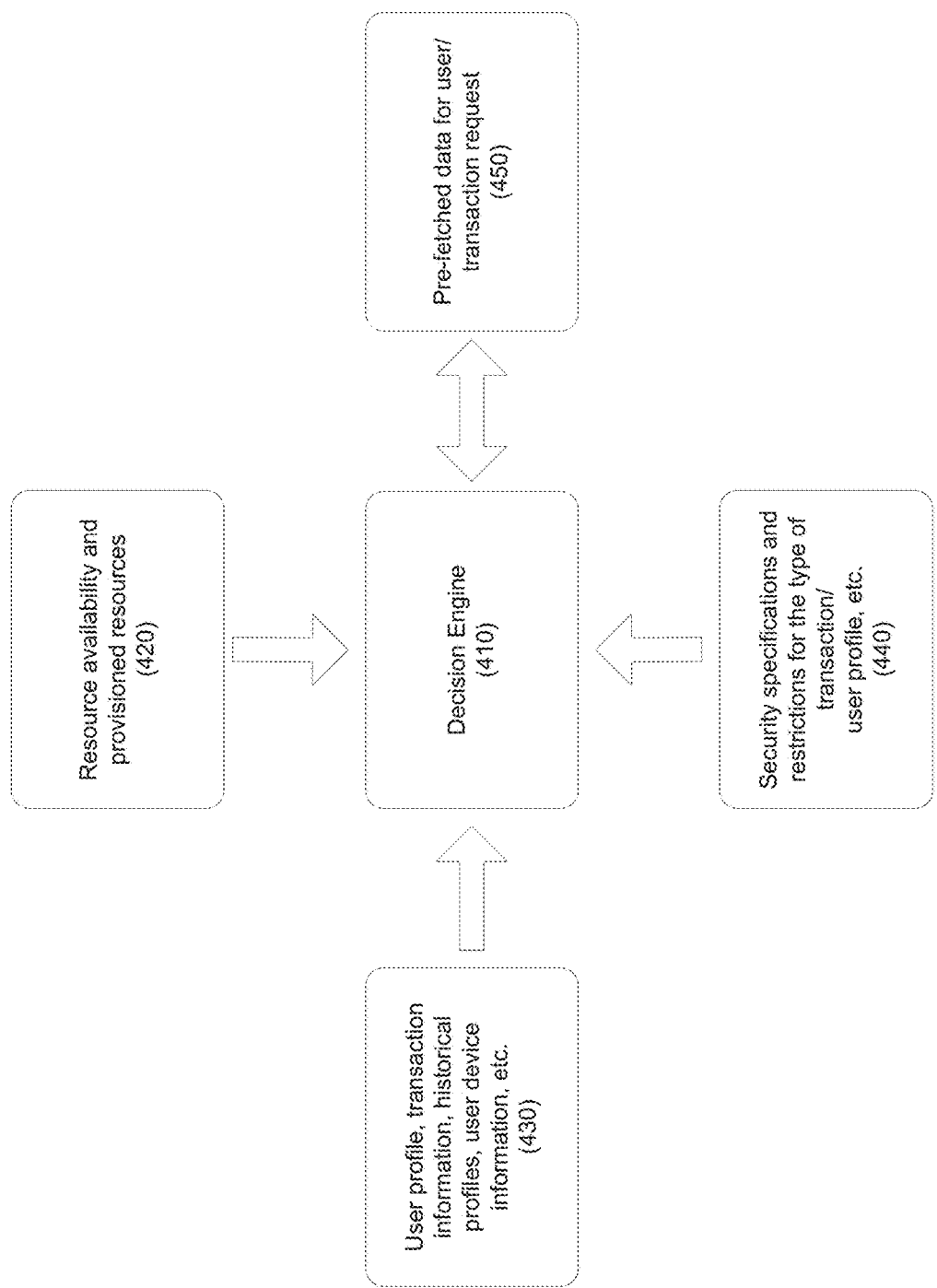
FIG. 4 is depiction of a decision engine according to one embodiment.

Referring to FIG. 4, a schematic representation of the backend is provided. Decision engine 410, which may be hosted by one or more servers, may communicate with a user and receive pre-fetched data and/or transaction requests 450. It may further receive resource availability and provisioned resources 420 that may be provided from the entity. For example, this data may come from a bank, ATMs, etc.

User profile, transaction information, historical profiles, device information, etc. 430 may also be provided. In addition, security specifications and restrictions that may apply to types of transactions, user profiles, etc. may also be received. Decision engine 410 may consider some or all of this data, as well as any data as necessary and/or desired, in establishing the provisioning queue. Other factors that may be considered include traffic, weather, special events, etc.

In one embodiment, decision engine 410 may optimize transaction partitioning based on the metrics (e.g., performance, user preferences, etc.) within the given requirements (e.g., security profiles for transaction type, device type, etc.) for the given time instance t. This metric-based evaluation may include real-time data on resource availability, traffic, queue/delay information, etc.

In one embodiment, the optimization function may vary depending on the implementation instance. For example, the optimization function may optimize the time to complete the service the user requested, it may optimize the utilization of banking resources, it may optimize user satisfaction, etc. The optimization function may optimize any suitable metric or metrics as necessary and/or desired.

Figure 5:
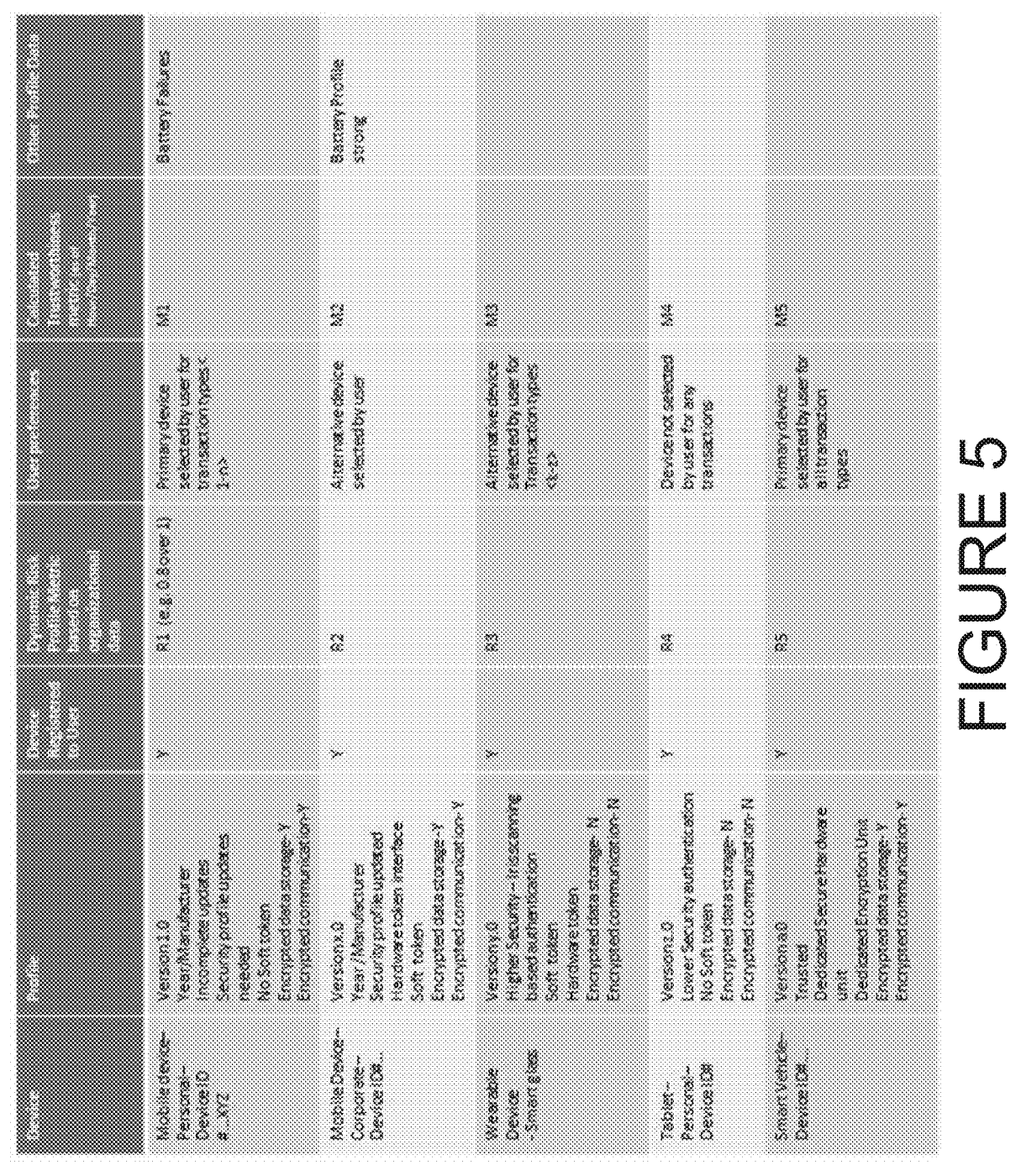
Figure 6:
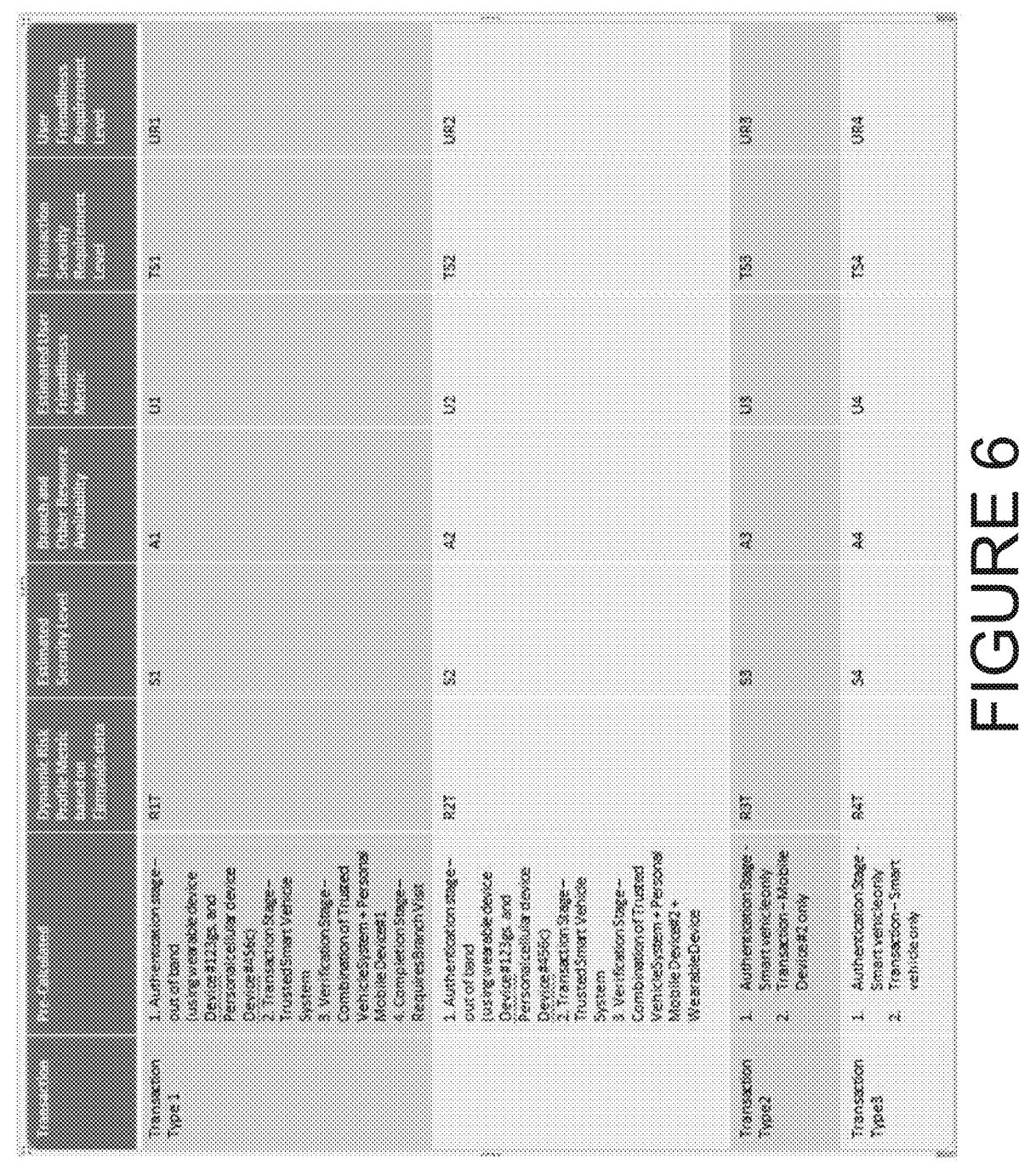

FIGS. 5 and 6 depict tables that may be used in transaction authorization according to exemplary embodiments. For example, FIG. 5 depicts a table that may provide device information for a user, such as the device name or type, a profile for the device, whether the device is registered to the user, a dynamic risk profile metric for the device, the user's preference for the device (primary, primary for certain types, alternative device, etc.), a trustworthiness metric for the device, and any other profile data (e.g., battery strength, communication capabilities, etc.). This table is exemplary only and it should be recognized that additional or fewer devices and device characteristics may be included as is necessary and/or desired.

For example, the user device profile in FIG. 5 may include two mobile devices (a personal device and a corporate device), and each device may have its own security and trustworthiness properties, frequency of use/usage pattern profile, whether it has a software security token, year/manufacturer, authentication features, data acquisition channels and profiles of other applications installed on the device, security path update profile, anti-virus protection installed or not, etc.

In one embodiment, each device may have an associated trustworthiness metric. The trustworthiness metric function may be updated and recalculated at run time given the system and device specifications as well as any other security information (e.g., known viruses, required patches, etc.). The trustworthiness metric function may combine some or all of these parameters with unique multiplier coefficients that may be machine-learned by the back-end system from a wide range of users. For example, if a number of security breaches have been identified for a particular make/model/operating system of a mobile device, the trustworthiness metric may reflect this increased risk based on, for example, data collected by a bank's users and security breach counts/trends.

Similarly, the user may have a smart device (e.g., glasses, watch, bracelet, etc.) with similar security information that may be stored in the system. In one embodiment, the intelligent vehicle system itself may be one of these entries, which may locally interact with any or all of devices if available.

In one embodiment, the back-end server may retrieve this information while conducting a transaction. In one embodiment, the information may be stored with the back-end server. In another embodiment, this information may be stored remotely, such as with the user's vehicle, mobile device, etc.

FIG. 6 depicts an exemplary table that may specify preferences for the way that certain transactions may be handled. In one embodiment, it may represent a fast decision process where pre-calculated decisions (based on statistical analysis of historical data) may be stored to guide the decision process. This may provide guidance on how to partition the transactions based on known profiles.

In one embodiment, the table in FIG. 6 may be defined by the approving authority (e.g., a financial instrument) and may specify the rules for conducting a transaction.

The table may include a "pre-calculated" column that may be used to store pre-calculated cases for the user's available for, frequent transactions, for specific user devices, user preferences (e.g. the user may not want to use a corporate mobile phone to perform a banking transaction), etc. For example, FIG. 6 identifies three transaction types, and each transaction type may have one or more pre-calculated solutions. The number of transaction types may vary, as may the number of pre-calculated solutions for each transaction type.

For example, for Transaction Type 1, two pre-calculated solutions are provided. Solution 1 includes four parts—the first is out of band authentication using the user's wearable device and the user's personal cellular device. Part 2 is a transaction stage using the vehicle's trusted vehicle systems. Part 3 is a verification stage using a combination of the trusted vehicle system and the user's mobile device. Part 4 is completion of the transaction at a branch location.

Alternately, Transaction Type 1 may be conducted without requiring an in-person visit, but may have different authentication requirements.

The manner in which a transaction is conducted may depend on the user's device(s), the user's location (e.g., the user cannot visit a branch location if the user is not near a branch location), time of day, traffic and other environmental conditions, etc.

The pre-calculated transaction partitioning solutions may be stored in the table, where, for example, an exemplary entry for a money transfer may be characterized as transaction type 2, wherein the user may be authenticated using the smart vehicle, and then the transaction may be conducted using the mobile device.

FIG. 6 may also specify the security level for a type of transaction. For example, a money transfer transaction may require two factor authentication on a device with a software security token and password protection, as well as certain security updates required. Or it can require multi-modal biometric authentication with a one in million false accept rate, etc.

In one embodiment, the system may consider dynamically acquired run-time data to update and may recalculate the entries based on this data. For example, if the user's mobile device has less than 10% battery remaining, certain parts of the transaction may be performed by the vehicle's onboard system if, for example, run-time traffic information indicates that the user cannot reach a destination (branch or ATM) in time for a time sensitive transaction. As another example, variations in how a transaction is handled may be provided at run-time so that the user can stage the transaction on the vehicle system and then call a number and confirm the transaction, etc. As yet another example, environmental conditions (e.g., heavy traffic or adverse weather when the user is driving). These entries may be parameterized and may be coded as different modes (e.g., busy driver, low battery mobile device, single device available, etc.). Pre-calculation of any or all of these solutions may enhance the decision process, which may be fine-tuned using, for example, run-time information, user preferences, etc.

In addition, other external data, such as streaming security threat profiles, run-time traffic information, run-time utilization information for nearby branch and ATM locations, mobile banking resources, etc. may be considered as necessary and/or desired.

In one embodiment, one or more of the tables (or their equivalents) may be stored in different locations. For example, these tables may consider the amount of available storage and compute capacity of the devices. In an embodiment, abbreviated versions of the tables may be stored on the user's mobile devices, vehicle intelligent system, etc. In one embodiment, comprehensive data, such as a full security profile for the user, may be stored in the financial institution back-end.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized computer processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for transaction pre-fetching and provisioning, comprising:
   a vehicle comprising:
      a plurality of vehicle sensors each sensing a physical characteristic of a user;
      at least one input device for receiving a transaction request, the transaction request comprising an authentication portion to be completed using at least one vehicle computer processor, and a transaction portion to be completed using a remote resource; and
      a vehicle communication interface;
      wherein the at least one vehicle computer processor authenticates a user to conduct the transaction portion based on the physical characteristics sensed by the vehicle sensors by comparing the sensed physical characteristics to stored physical characteristics in a user profile;
   a plurality of remote resources for performing the transaction portion; and
   a decision engine that is remote from the vehicle comprising at least one computer processor in communication with the vehicle communication interface and the plurality of remote resources that:
      receives vehicle location data for the vehicle;
      receives the transaction request;
      identifies the authentication portion and the transaction portion;
      receives remote resource availability data regarding the availability of each of the plurality of remote resources wherein the remote resource availability comprises queue length or predicted wait time;

directs the at least one vehicle computer processor to perform the authentication portion using the sensed physical characteristics; and in response to the authentication:
- selects one of the plurality of remote resources based on the vehicle location, remote resource availability data, a characteristic of the transaction portion, and a past selection of one of the plurality of remote resources by the user;
- communicates the transaction portion to the selected remote resource; and
- communicates the selection of the remote resource and location information for the remote resource to the at least one vehicle computer processor, wherein the communication of the location causes a vehicle navigation system to present directions to the location on a display.

2. The system of claim 1, wherein the plurality of vehicle sensors are selected from the group consisting of a camera, a microphone, a weight sensor, a fingerprint sensor, a pressure sensor, a motion sensors, and an input device.

3. The system of claim 1, wherein the remote resources comprises a financial resource including one of an automated teller machine, a banking kiosk, a drive-through banking resource, and a branch facility.

4. The system of claim 1, further comprising a mobile electronic device in communication with at least one of the vehicle computer processor and the decision engine, wherein the mobile electronic device comprises at least one mobile electronic device sensor for sensing a characteristic of the user, and wherein the at least one vehicle computer processor authenticates a user based on the characteristics detected by the vehicle sensors and the mobile electronic device sensor.

5. A method for partitioning a transaction to be performed using a plurality of resources, comprising:
in an information processing apparatus comprising at least one computer processor:
- receiving a transaction request comprising an authentication portion and a transaction portion from a vehicle computer processor in a vehicle;
- identifying the authentication portion and the transaction portion; receiving a location of the vehicle from the vehicle computer processor; receiving remote resource availability data regarding the availability of each of the plurality of remote resources wherein the remote resource availability comprises queue length or predicted wait time directing the vehicle computer processor to perform the authentication portion to authenticate a user to conduct the transaction portion;
- selecting one of a plurality of remote resources based on the vehicle location, remote resource availability data, a characteristic of the transaction portion, and a past selection of one of the plurality of remote resources by the user;
- communicating the transaction portion to the selected remote resource; and
- communicating the selection of the remote resource and location information for the remote resource to the at least one vehicle computer processor, wherein the communication of the location causes a vehicle navigation system to present directions to the location on a display;
- wherein the information processing apparatus is remote from the vehicle.

6. The method of claim 5, wherein the vehicle further comprises a plurality of vehicle sensors, and each vehicle sensor detects a characteristic of the user.

7. The method of claim 6, wherein the vehicle computer processor authenticates the user based on the detected characteristics.

8. The method of claim 5, wherein the second resource comprises one of an automated teller machine, a banking kiosk, a drive-through banking resource, and a branch facility.

9. The method of claim 5, wherein the at least one decision engine computer processor further receives traffic data and selects the resource to perform the transaction portion based on the traffic data.

10. The method of claim 5, wherein the at least one decision engine computer processor further receives event data.

11. The method of claim 5, wherein the at least one decision engine computer processor further receives weather data and selects the resource to perform the transaction portion based on the weather data.

12. The method of claim 11, wherein the weather data is for a location of the vehicle.

13. The method of claim 11, wherein the weather data is for a location of each of the plurality of resources.

14. The method of claim 5, further comprising:
retrieving capability information for a plurality of resources for conducting the transaction portion; wherein the remote resource to perform the transaction is further selected based on the capability information for the plurality of remote resources.

* * * * *